United States Patent [19]

Takahashi

[11] Patent Number: 5,720,370
[45] Date of Patent: Feb. 24, 1998

[54] ROTARY DAMPER

[75] Inventor: Kenji Takahashi, Tokyo, Japan

[73] Assignee: Tok Bearing Co., Ltd., Tokyo, Japan

[21] Appl. No.: 643,896

[22] Filed: May 7, 1996

[30] Foreign Application Priority Data

May 10, 1995 [JP] Japan ................... 7-136201

[51] Int. Cl.$^6$ ................................................. F16F 9/14
[52] U.S. Cl. ................... 188/310; 188/299; 188/306
[58] Field of Search .............................. 188/290–296,
188/306, 310–313, 316–319, 322.5, 573 F;
74/574; 464/24, 25; 16/82; 192/58.682,
82 T; 137/625.11; 418/173, 185, 189

[56] References Cited

U.S. PATENT DOCUMENTS

| | | | |
|---|---|---|---|
| 3,653,228 | 4/1972 | Tiberio | 64/26 |
| 4,893,522 | 1/1990 | Arakawa | 74/574 |
| 5,152,189 | 10/1992 | Miura | 74/573 F |

FOREIGN PATENT DOCUMENTS 446227  2/1992  Japan ................... 188/310

Primary Examiner—Robert J. Oberleitner
Assistant Examiner—C. T. Bartz
Attorney, Agent, or Firm—Merchant, Gould, Smith, Edell, Welter & Schmidt

[57] ABSTRACT

A rotary damper has a cylindrical casing having a chamber filled with a viscous fluid, a rotor rotatably mounted in the cylindrical casing, a movable valve mounted in the cylindrical casing for adjusting a flow of the viscous fluid in the chamber, a flange mounted in the casing and having a pair of through holes defined therein and communicating with the chamber, and a torque adjustment disk angularly movably mounted in the casing and having an orifice held in communication with the through holes. The orifice has a cross-sectional area varying progressively from an end thereof toward an opposite end thereof, wherein a torque applied by the rotor can be adjusted by angularly moving the torque adjustment disk.

9 Claims, 6 Drawing Sheets

ROTARY DAMPER

BACKGROUND OF THE INVENTION

1. Field of the Invention

The present invention relates to a rotary damper for producing variable torques.

2. Description of the Prior Art

One known rotary damper for dampening high torques is disclosed in Japanese laid-open patent publication No. 4-282039. As shown in FIG. 10 of the accompanying drawings, the disclosed rotary damper comprises a casing 3 having a cylindrical chamber 1 filled with a viscous fluid 2, a rotor 5 rotatably disposed coaxially in the casing 3 and having a central shaft 4 rotatable in the chamber 1, and a movable valve 7 engageable with an rotor vane 6 projecting radially outwardly from the shaft 4 through a clearance 7b in the direction in which the valve 7 is angularly movable, the movable valve 7 having a radially outer surface held in slidable contact with an inner circumferential wall surface of the chamber 1. The movable valve 7 has fluid passages 8, 9 defined in respective spaced legs 7a thereof which can contact the rotor vane 6, and the rotor vane 6 has a fluid passage 10 defined in a portion thereof which can contact the spaced legs 7a of the movable valve 7. The fluid passages 8, 9, 10 have different cross-sectional areas.

When the casing 3 and the rotor 5 rotate relative to each other, the rotor vane 6 is brought into contact with one of the legs 7a of the movable valve 7, which is then angularly moved with the rotor vane 6 in the viscous fluid 2. If the rotor vane 6 contacts the leg 7a with the fluid passage 8 defined therein, then the viscous fluid 2 flows through the fluid passages 8, 10 and the clearance 7b which is presently defined between the other leg 7a and the rotor vane 6. Since the fluid passage 8 has a smaller cross-sectional area, the rotor 5 and the movable valve 7 are subjected to a larger resistance, and the rotary damper produces a larger torque. If the rotor vane 6 contacts the leg 7a with the fluid passage 10 defined therein, then the viscous fluid 2 flows through the fluid passages 9, 10 and the clearance 7b which is presently defined between the other leg 7a and the rotor vane 6. Since the fluid passage 9 has a larger cross-sectional area, the rotor 5 and the movable valve 7 are subjected to a smaller resistance, and the rotary damper produces a smaller torque.

The smaller the cross-sectional area of the fluid passage 8, the greater the torque which is produced by the rotary damper. Therefore, the torque produced by the rotary damper can be varied by varying the cross-sectional area of the fluid passage 8. However, if the torque produced by the rotary damper is to be varied, then it is necessary to select a movable valve 7 whose fluid passage 8 has a different cross-sectional area. Therefore, the rotary damper has to be disassembled, and the movable valve 7 has to be replaced with a selected movable valve 7, after which the rotary damper has to be assembled again.

The process of disassembling the rotary damper, replacing the movable valve 7 with a selected movable valve 7, and then reassembling the rotary damper is tedious and time consuming. It is impossible for the user to make fine adjustment of the torque produced by the rotary damper at a site of use.

SUMMARY OF THE INVENTION

It is therefore an object of the present invention to provide a rotary damper which is of a simple structure and can be adjusted with a single screwdriver to vary torques produced thereby.

According to the present invention, there is provided a rotary damper comprising a cylindrical casing having a chamber filled with a viscous fluid, a rotor rotatably mounted in the cylindrical casing, movable valve means mounted in the cylindrical casing for adjusting a flow of the viscous fluid in the chamber, a flange mounted in the casing and having a pair of through holes defined therein and communicating with the chamber, and a torque adjustment disk angularly movably mounted in the casing and having an orifice held in communication with the through holes, the orifice having a cross-sectional area varying progressively from an end thereof toward an opposite end thereof, wherein a torque applied by the rotor can be adjusted by angularly moving the torque adjustment disk.

The orifice may comprise an arcuate groove, and the arcuate groove may have a depth which is gradually deeper from the end toward the opposite end.

The orifice may comprise an arcuate groove, and the arcuate groove may have a width which is gradually larger from the end toward the opposite end.

The movable valve means may comprise a single movable valve or a pair of diametrically opposite movable valves.

The rotary damper may further comprise a ring spring acting on the torque adjustment disk for normally biasing the torque adjustment disk toward the flange.

According to the present invention, there is also provided a rotary damper comprising a cylindrical casing having a chamber filled with a viscous fluid, a rotor rotatably mounted in the cylindrical casing, a movable valve mounted in the cylindrical casing and coacting with the rotor, for adjusting a flow of the viscous fluid in the chamber, and torque adjustment means angularly movably mounted in the casing, for adjusting a torque applied by the rotor through an orifice having a cross-sectional area which is progressively variable from an end thereof toward an opposite end thereof depending on an angular position of the torque adjustment means in the casing.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
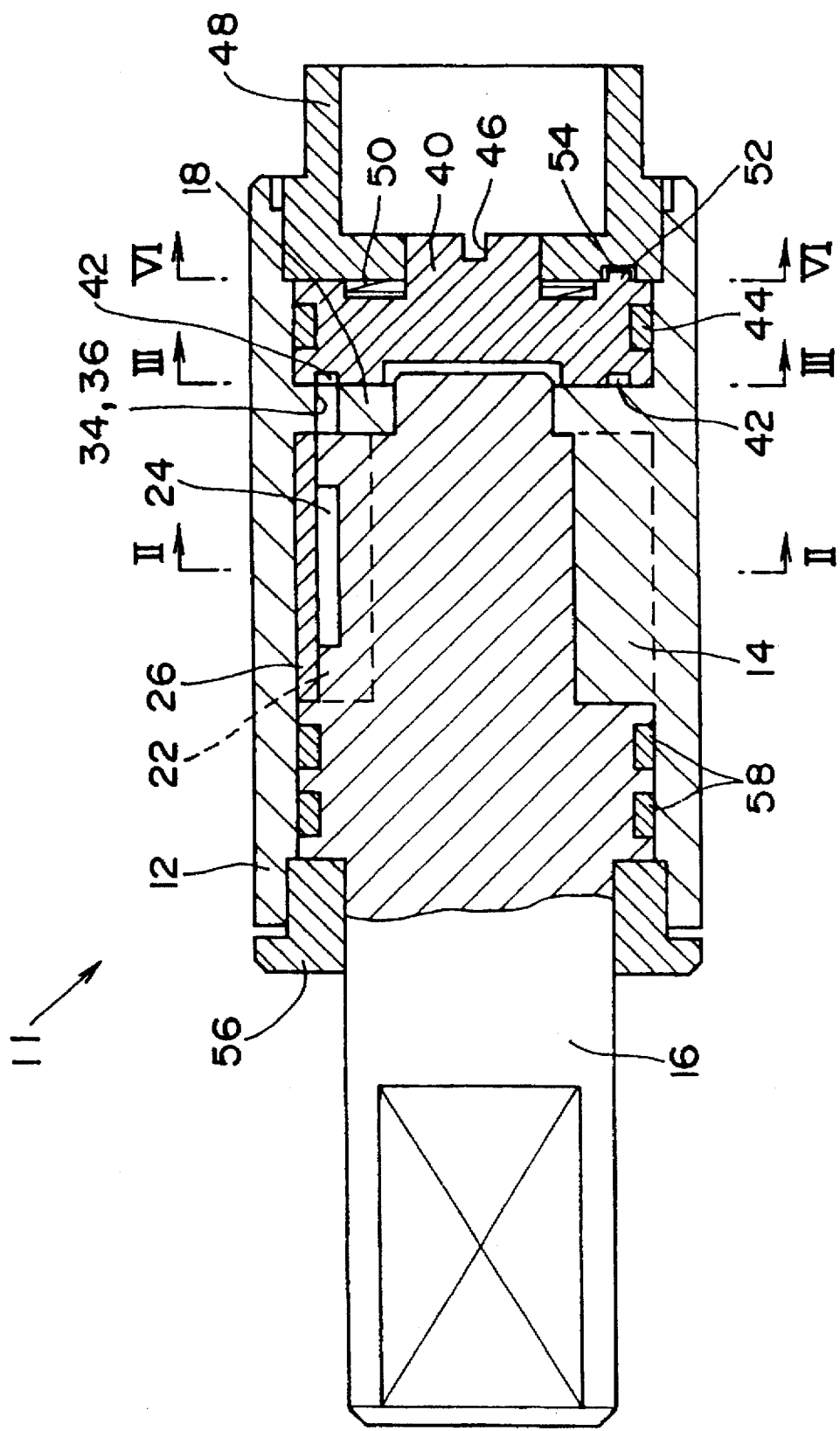
FIG. 1 is an axial cross-sectional view of a rotary damper according to an embodiment of the present invention.

Like or corresponding parts are denoted by like or corresponding reference numerals throughout the views.

Figure 2:
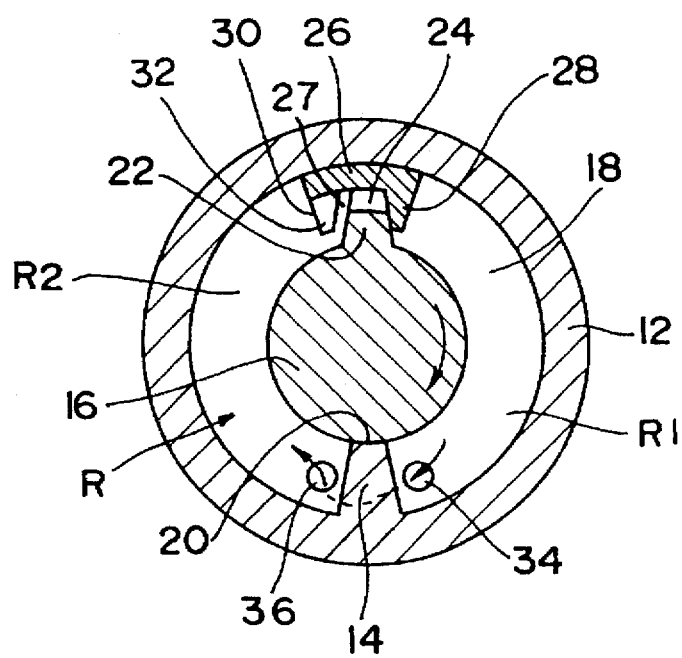
FIG. 2 is a cross-sectional view taken along line II—II of FIG. 1.
Figure 3:
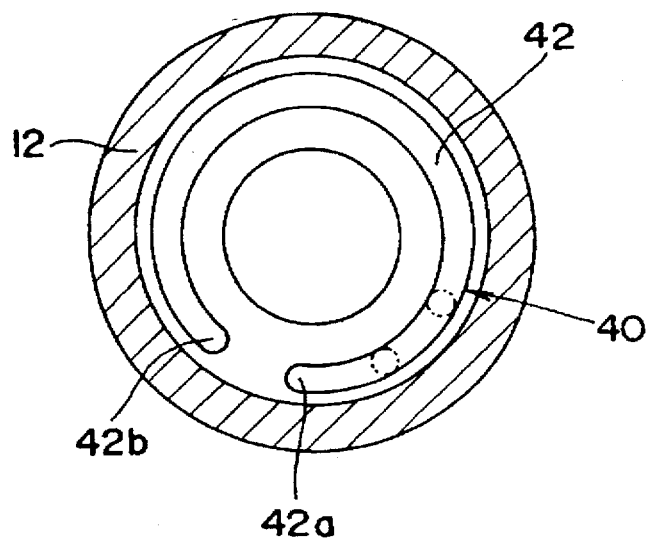
FIG. 3 is a cross-sectional view taken along line III—III of FIG. 1.

As shown in FIGS. 1 through 3, a rotary damper, generally designated by the reference numeral 11, according to an embodiment of the present invention has a cylindrical casing 12 serving as an outer frame which has a chamber R filled with a highly viscous fluid F such as grease.

The casing 12 has a casing vane 14 disposed in the chamber R. The casing vane 14 is integral with and extends longitudinally axially in the casing 12, and projects radially inwardly toward the center of the casing 12. The casing vane 14 serves as a stop for limiting angular movement of a rotor 16.

The rotor 16 is positioned coaxially in the casing 12 and rotatable with respect to the casing 12. The rotor 16 is fitted in the casing 12 with a pair of axially spaced O-rings 58 extending around the rotor 16 and held against an inner circumferential surface of the casing 12. The rotor 16 serves as an input shaft having an outer end portion projecting axially out of the casing 12, and has an inner end rotatably supported by a ring-shaped flange 18 projecting radially inwardly from the casing 12 into the chamber R. To the outer end portion of the rotor 16, there will be applied a torque to be dampened from a rotatable member (not shown).

The casing vane 14 has a radially inner end surface which is slightly spaced radially outwardly from an outer circumferential surface of the rotor 16 by a clearance 20 which allows the viscous fluid F to flow therethrough. Therefore, the rotor 16 can be angularly moved with respect to the casing vane 14.

The rotor 16 has an integral rotor vane 22 extending axially thereof and projecting radially outwardly therefrom. The rotor vane 22 has a fluid passage 24 defined in a radially outer end thereof and extending axially over a certain distance in an axially central portion thereof.

A movable valve 26 positioned between the casing 12 and the rotor vane 22 has a radially inwardly concave cross-sectional shape as shown in FIG. 2. The movable valve 26 has an axial length which is substantially the same as the axial length of the rotor vane 22, and covers substantially fully the rotor vane 22 in loose engagement therewith. The movable valve 26 has an outer circumferential surface held slidably against an inner circumferential surface of the casing 12. When the rotor 16 rotates about its own axis, the movable valve 26 moves with the rotor 16 through a lost-motion connection to the rotor vane 22.

As shown in FIG. 2, the movable valve 26 has a recess 27 defined therein and opening radially inwardly, and the rotor vane 22 is movably positioned in the recess 27. The recess 27 is defined between a pair of spaced legs 28, 30 of the movable valve 26 in the direction in which the rotor vane 22 is movable in the movable valve 26. The recess 27 has a width greater than the thickness of the rotor vane 22 such that the rotor vane 22 is movable in the recess 27 between the legs 28, 30.

The leg 28 is a closed leg with no fluid passage defined therein, and the leg 30 is an open leg with a fluid passage 32 defined therein. The fluid passage 32 is defined centrally in the open leg 30 in substantially axially coexistent relation to the fluid passage 24 in the rotor vane 22. When the rotor 16 rotates counterclockwise with respect to the casing 12 in FIG. 2, the rotor vane 22 is brought into contact with the open leg 30 of the movable valve 26, providing direct communication between the fluid passages 24, 32, and at the same time the rotor vane 22 is spaced away from the closed leg 28 thereof, leaving a relatively large gap between the closed leg 28 and the rotor vane 22. The viscous fluid F now flows through the fluid passages 24, 32 and the large gap between the closed leg 28 and the rotor vane 22. At this time, the viscous fluid F flows smoothly, and the rotary damper does not dampen the torque applied by the rotor 16.

The chamber R in the casing 12 is divided into two chambers by the casing vane 14 and the movable valve 26, i.e., a first chamber R1 defined between the closed leg 28 and the casing vane 14 and a second chamber R2 defined between the open leg 30 and the casing vane 14.

The flange 18 has a pair of first and second through holes 34, 36 defined axially therein and spaced a certain distance from each other, as shown in FIG. 2. The first and second through holes 34, 36 communicate with the chamber R, and are positioned symmetrically with respect to the casing vane 14 which is disposed intermediate therebetween. The first through hole 34 is positioned in the first chamber R1 and the second through hole 36 is positioned in the second chamber R2.

Figure 4:
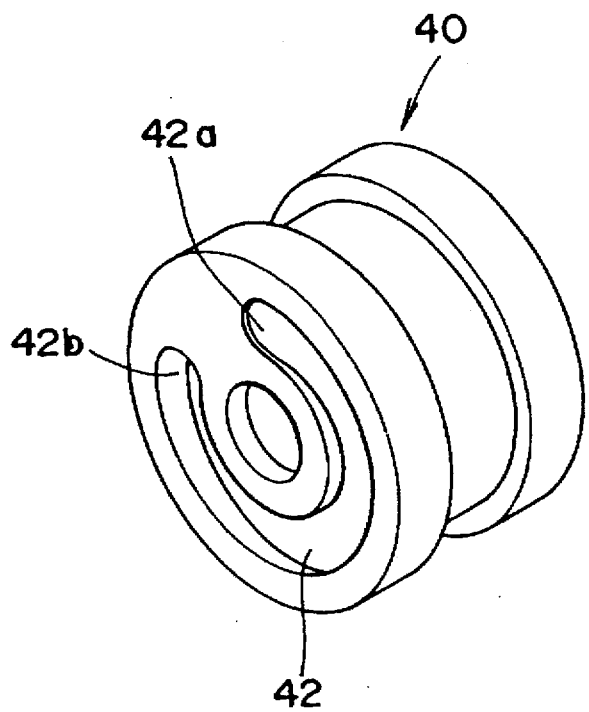
FIG. 4 is a perspective view of a torque adjustment disk of the rotary damper shown in FIG. 1.

A torque adjustment disk 40 is housed in the casing 12 axially adjacent to the flange 18 remotely from the rotor 16, for adjusting the torque of the rotor 16. As shown in FIGS. 3 and 4, the torque adjustment disk 40 has an orifice 42 defined as an arcuate groove in a surface thereof which faces the flange 18 and extending concentrically around the central axis thereof. The orifice 42 has its opposite ends spaced from each other. However, the orifice 42 may comprise a fully circular, endless orifice.

The first and second through holes 34, 36 are positioned such that they always are axially aligned with, i.e., communicate with, the orifice 42.

Figure 5:
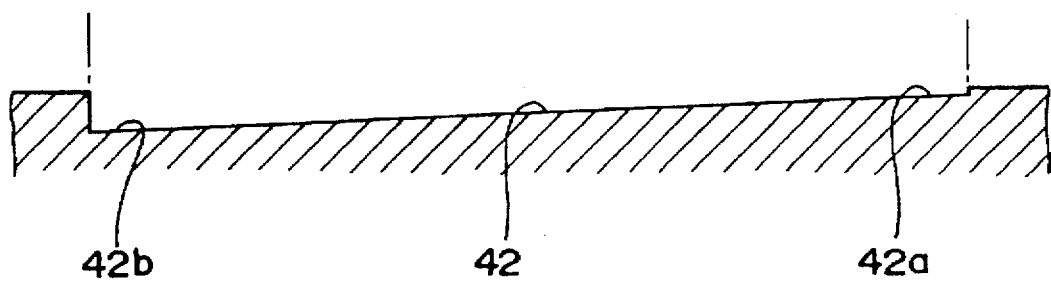
FIG. 5 is a diagram showing a linear representation of an arcuate orifice defined in the torque adjustment disk shown in FIG. 4.

The orifice 42 has its depth gradually, e.g., linearly, varying such that it is shallowest at one end 42a thereof and deepest at an opposite end 42b thereof. FIG. 5 is a linear representation of a varying cross-sectional shape of the orifice 42, showing the manner in which its depth and hence cross-sectional area gradually vary from the end 42a to the end 42b.

Since the first and second through holes 34, 36 are held in communication with the orifice 42 at all times, the viscous fluid F can flow from the first through hole 34 through the orifice 42 to the second through hole 36. While the first and second through holes 34, 36 have a constant size, the torque applied by the rotor 16 can be varied when the positional relationship between the first and second through holes 34, 36 and the orifice 42 is varied, because the orifice 42 has a different depth at a different position confronted by the first and second through holes 34, 36, restricting the viscous fluid F to flow at a different rate.

The torque adjustment disk 40 is angularly movably fitted in the casing 12 with a hermetic O-ring 44 extending around the torque adjustment disk 40 and held against the inner circumferential surface of the casing 12. The torque adjustment disk 40 has a screwdriver bit slot 46 defined in an axial end surface thereof which faces away from the orifice 42. The screwdriver bit slot 46 opens outwardly through an end of the casing 12 for receiving a screwdriver bit inserted from outside of the casing 12. When a screwdriver bit is inserted into the screwdriver bit slot 46 and turned, the torque adjustment disk 40 is angularly moved to angularly adjust the orifice 42 with respect to the first and second through holes 34, 36 which are held in communication therewith.

The torque adjustment disk 40 is stably held in position in the casing 12 by a cover 48 (see FIG. 1) which is partly fitted in the end of the casing 12. If both the casing 12 and the cover 48 are made of plastics, then they may be fused to each other or may be fastened to each other by threaded engagement. If both the casing 12 and the cover 48 are made of metal, then they may be fastened to each other by threaded engagement.

The torque adjustment disk 40 is normally biased into intimate contact with the flange 18 by a ring spring 50 which is interposed between the torque adjustment disk 40 and the cover 48.

Figure 6:
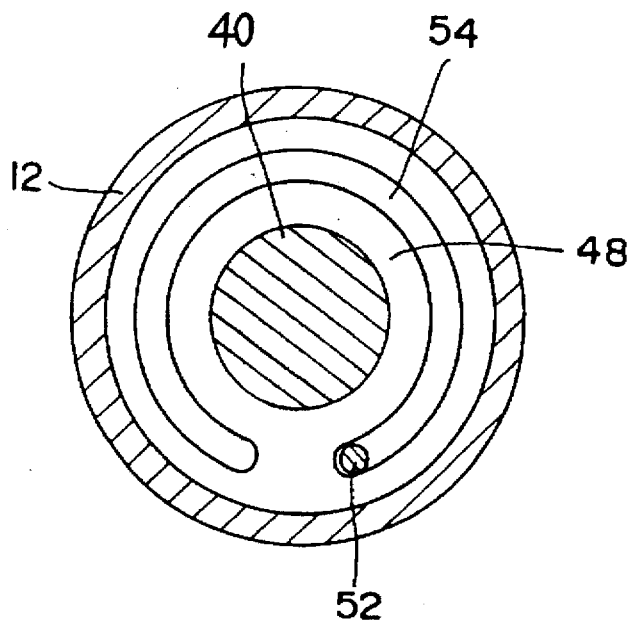
FIG. 6 is a cross-sectional view taken along line VI—VI of FIG. 1.

As shown in FIGS. 1 and 6, the torque adjustment disk 40 has a pin 52 projecting axially into an arcuate guide groove 54 which is defined in an inner end surface of the cover 48. Therefore, the torque adjustment disk 40 can rotate along the guide groove 54, and stops its rotation when the pin 52 engages either one of the opposite ends of the guide groove 54. However, the guide groove 54 may be of a continuously circular shape to only guide the torque adjustment disk 40 for its rotation, and not to limit the rotation of the torque adjustment disk 40.

The end portion of the rotor 16 which projects out of the casing 12 is retained against removal from the casing 16 by a cap 56 which is securely fitted in the casing 12. If both the cap 56 and the casing 12 are made of plastics, then they may be fused to each other or may be fastened to each other by threaded engagement. If both the cap 56 and the casing 12 are made of metal, then they may be fastened to each other by threaded engagement.

Operation of the rotary damper 11 will be described below.

When the rotor 16 is rotated clockwise (FIG. 2) with respect to the casing 12, the rotor vane 22 contacts the closed leg 28 of the movable valve 26, closing the gap between the rotor vane 22 and the closed leg 28. Further rotation of the rotor 16 causes the viscous fluid F to flow from the first chamber R1 through the first through hole 34, the orifice 42, and the second through hole 36 into the second chamber R2.

If the torque applied by the rotor 16 is to be varied, the torque adjustment disk 40 is turned by a screwdriver bit, changing the relative position of the first and second through holes 34, 36 and the orifice 42 until a desired torque is reached.

Inasmuch as the cross-sectional area of the orifice 42 at a position confronted by the first and second through holes 34, 36 can easily be varied by turning the torque adjustment disk 40, the torque applied by the rotor 16 can easily be adjusted. Even if the viscosity of the viscous fluid F varies depending on the temperature, varying the torque that is dampened by the rotary damper, the torque can easily be adjusted by the torque adjustment disk 40.

Figure 7:
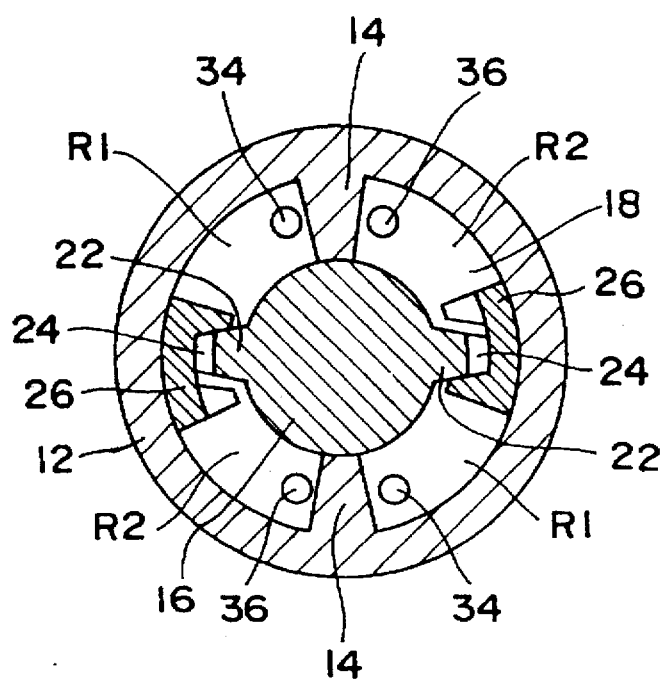
FIG. 7 is a cross-sectional view similar to FIG. 2, showing a rotary damper according to another embodiment of the present invention.

FIG. 7 shows in cross section a rotary damper according to another embodiment of the present invention. In FIG. 7, a casing 12 has a pair of diametrically opposite casing vanes 14 projecting radially inwardly, and houses a pair of movable valves 26 disposed between the casing vanes 14. A rotor 16 rotatably disposed coaxially in the casing 12 has a pair of diametrically opposite rotor vanes 22 projecting radially outwardly and held in loose engagement with the respective casing vanes 14. The rotor 16 is angularly movable in either direction through an angular range of less than 180°. However, the angular range of movement of the rotor 16 may be made closer to 180° by reducing the circumferential thickness of the casing vanes 14.

Figure 8:
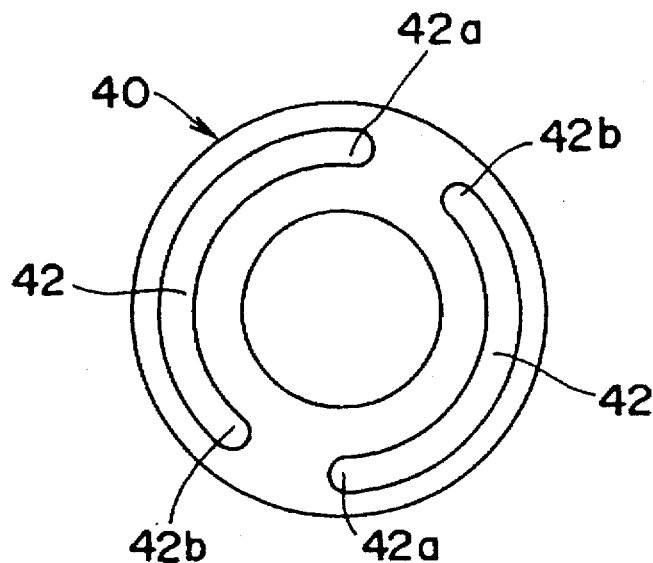
FIG. 8 is a front elevational view showing an orifice defined in a torque adjustment disk of the rotary damper shown in FIG. 7.

As shown in FIG. 8, a torque adjustment disk 40 which is used in the rotary damper shown in FIG. 7 has a pair of symmetrical diametrically opposite arcuate orifices 42 communicating with respective pairs of first and second through holes 34, 36 (see FIG. 7) that are defined in a flange 18.

Figure 9:
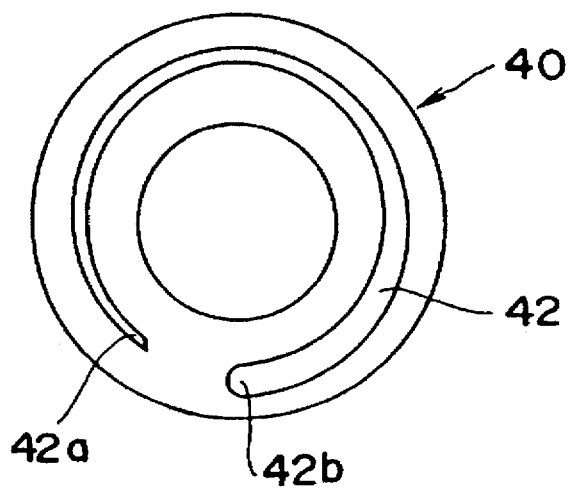
FIG. 9 is a front elevational view showing an orifice defined in a torque adjustment disk according to still another embodiment of the present invention.
Figure 10:
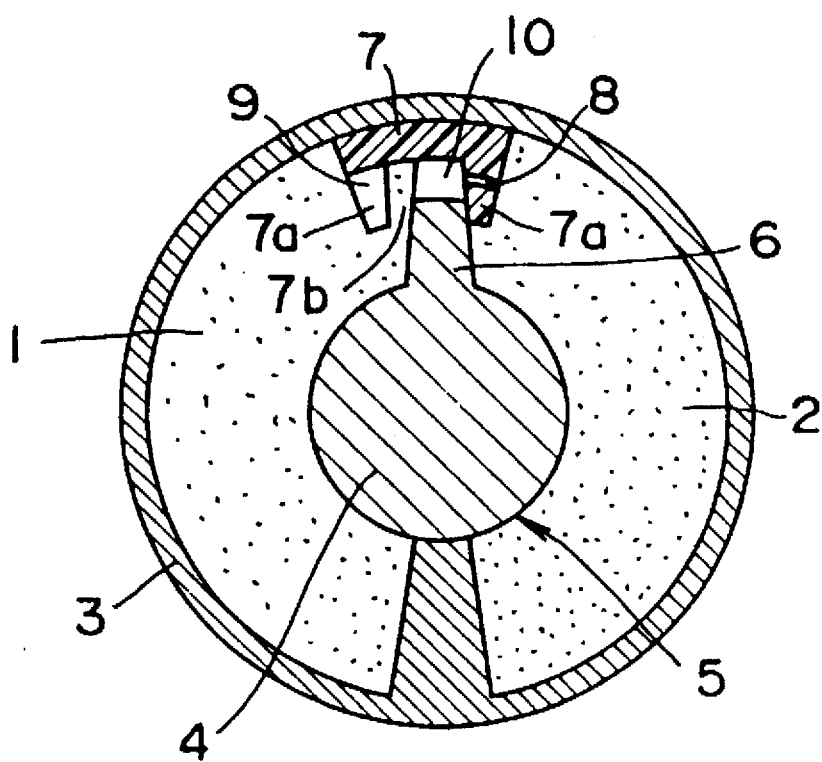
FIG. 10 is a cross-sectional view of a conventional rotary damper.

FIG. 9 shows an orifice 42 defined in a torque adjustment disk 40 according to still another embodiment of the present invention. In FIG. 9, the orifice 42 has a width gradually varying from an end 42a thereof toward an opposite end 42b thereof. Since the orifice 42 has a gradually varying width and hence cross-sectional area, a viscous fluid flows in the orifice 42 at a different rate at a different position, varying the torque applied by the rotor.

While the orifice 42 in each of the above embodiments has its cross-sectional area continuously varying from one end to the other, the cross-sectional area thereof may vary stepwise or uncontinuously.

The rotary damper according to the present invention may be made of plastics or metal. However, if the rotary damper is made of plastics, it may easily be mass-produced, and hence may be inexpensive to manufacture.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A rotary damper comprising:
   a cylindrical casing having a chamber filled with a viscous fluid;
   a rotor rotatably mounted in said cylindrical casing;
   movable valve means mounted in said cylindrical casing for adjusting a flow of said viscous fluid in said chamber;
   a flange mounted in said casing, supporting one end of a shaft of said rotor and having a pair of through holes defined therein and communicating with said chamber; and
   a torque adjustment disk mounted in said casing, being angularly movable about an axis of said casing and having an orifice held in communication with said through holes;
   said orifice having a cross-sectional area varying progressively from an end thereof toward an opposite end thereof, wherein a torque applied by said rotor can be adjusted by angularly moving said torque adjustment disk.

2. A rotary damper according to claim 1, wherein said orifice comprises an arcuate groove, said arcuate groove having a depth which is gradually deeper from said end toward said opposite end.

3. A rotary damper according to claim 1, wherein said orifice comprises an arcuate groove, said arcuate groove having a width which is gradually larger from said end toward said opposite end.

4. A rotary damper according to claim 1, wherein said movable valve means comprises a single movable valve.

5. A rotary damper according to claim 1, wherein said movable valve means comprises a pair of diametrically opposite movable valves.

6. A rotary damper according to claim 1, further comprising a ring spring acting on said torque adjustment disk for normally biasing said torque adjustment disk toward said flange.

7. A rotary damper comprising:

a cylindrical casing having a chamber filled with a viscous fluid;

a rotor rotatably mounted in said cylindrical casing;

a movable valve mounted in said cylindrical casing and coacting with said rotor, for adjusting a flow of said viscous fluid in said chamber; and torque adjustment means mounted in said casing, being angularly movable about an axis of said casing and for adjusting a torque applied by said rotor through an orifice having a cross-sectional area which is progressively variable from an end thereof toward an opposite end thereof depending on an angular position of the torque adjustment means in said casing.

8. A rotary damper according to claim 7, wherein said orifice comprises an arcuate groove, said arcuate groove having a depth which is gradually deeper from said end toward said opposite end.

9. A rotary damper according to claim 7, wherein said orifice comprises an arcuate groove, said arcuate groove having a width which is gradually larger from said end toward said opposite end.

* * * * *